United States Patent Office 3,520,284
Patented July 14, 1970

3,520,284
INTERNAL COMBUSTION ENGINE AIR INTAKE
Karl Ruoff, Kirchheim, Teck, and Leopold Jantschke, Stuttgart-Bad Cannstatt, Germany, assignors to Firma Dr.-Ing. h.c.F. Porsche KG, Stuttgart-Zuffenhausen, Germany
Filed June 3, 1968, Ser. No. 734,164
Claims priority, application Germany, June 3, 1967, 1,576,402
Int. Cl. F02b 75/18, 75/22
U.S. Cl. 123—52     10 Claims

ABSTRACT OF THE DISCLOSURE

A synthetic distribution chamber is disposed above and between the oppositely positioned working cylinders of an internal combustion engine and is provided with tubular fittings telescopically receiving therein the tubular portions of the individual cylinder stub intake conduits, with resilient rings therebetween, to form the only support for the distribution chamber. The axes of the conduits intersect each other at an angle and intersect the axis of the inlet port for the distribution chamber.

BACKGROUND OF THE INVENTION

It is known to provide a welded construction for air intake distribution chambers and individual intake conduits for each row of cylinders with respect to engines having oppositely disposed rows of cylinders. The free ends of the intake conduits being mounted by means of appropriate flanges to their respective cylinder heads opposite the cylinder intake ports. Such a construction of the intake chamber requires a considerable expenditure in structural parts, particularly complicated welding devices and procedures, to assure accurate positioning and dimensional accuracy between intake conduits. Also, there is considerable difficulty experienced in assembling the various components, which is cumbersome and time consuming.

SUMMARY OF THE INVENTION

The present invention avoids the above-mentioned disadvantages by freely supporting the air distribution chamber on the stub intake conduits, which extend into the chamber with the interposition of resilient means. Such a construction is quite simple with respect to manufacturing, does not require any expensive welding apparatus, and alignment errors of the intake conduits with respect to each other and relative to the air distribution chamber are readily compensated for. Also, no additional or special support is necessary for the air distribution chamber. A particularly simple assembly with resulting alignment of the air distribution chamber with respect to the intake conduits for the cylinders is accomplished by constructing the intake conduits so that their end central axes intersect each other and the central axis of the air inlet port for the distribution chamber. Advantageously, each intake stub conduit is surrounded by a resilient ring telescopically guided in a suitable tubular fitting within the side wall of the air distribution chamber. The resilient ring is preferably held in an annular holder connected with the intake stub conduit, which holder extends between the tubular fitting and the intake conduit.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
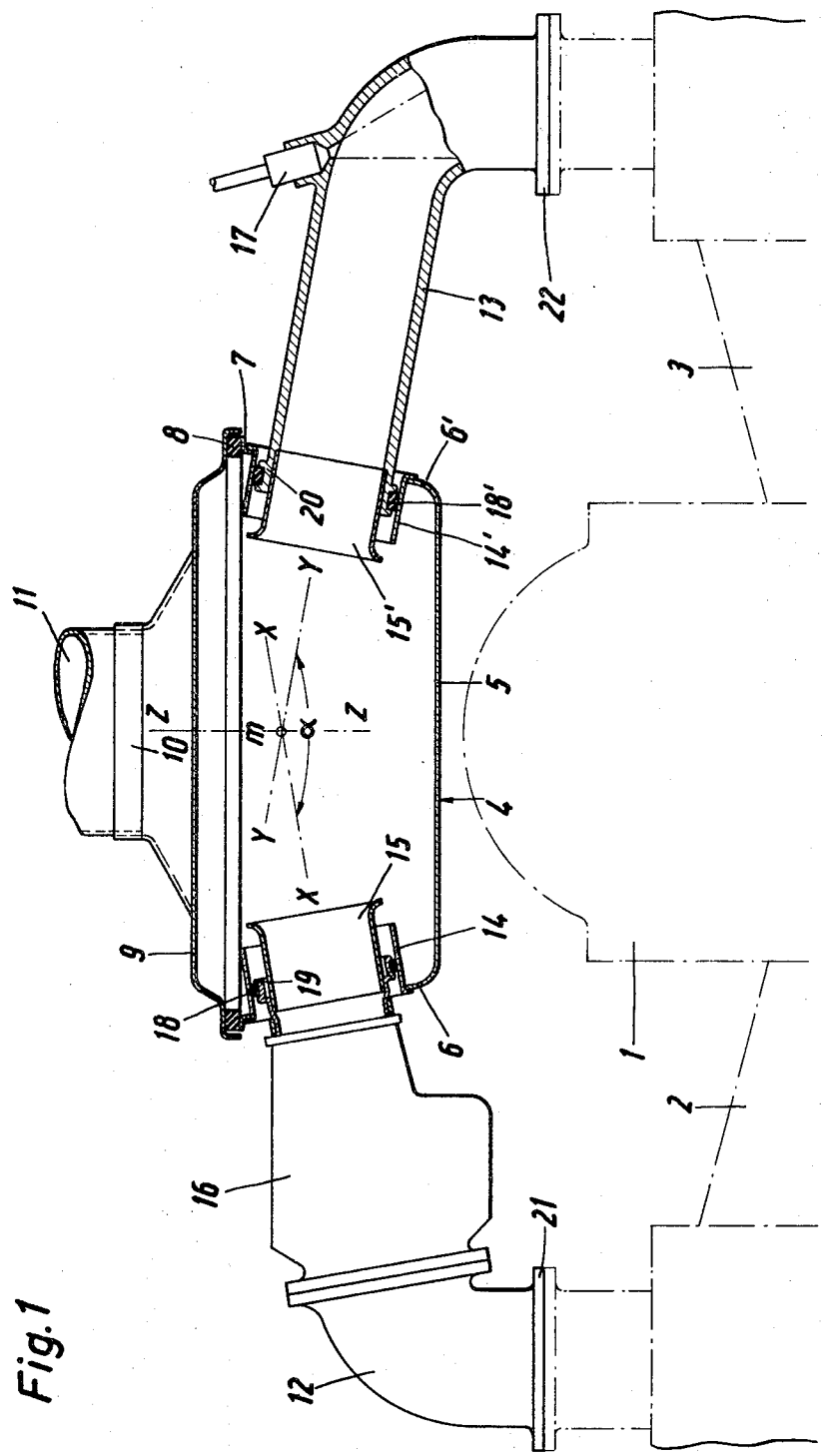
FIG. 1 is a partial cross sectional view transverse to the engine crank shaft, showing an internal combustion engine with opposed cylinders and the air distribution chamber of the present invention.
Figure 2:
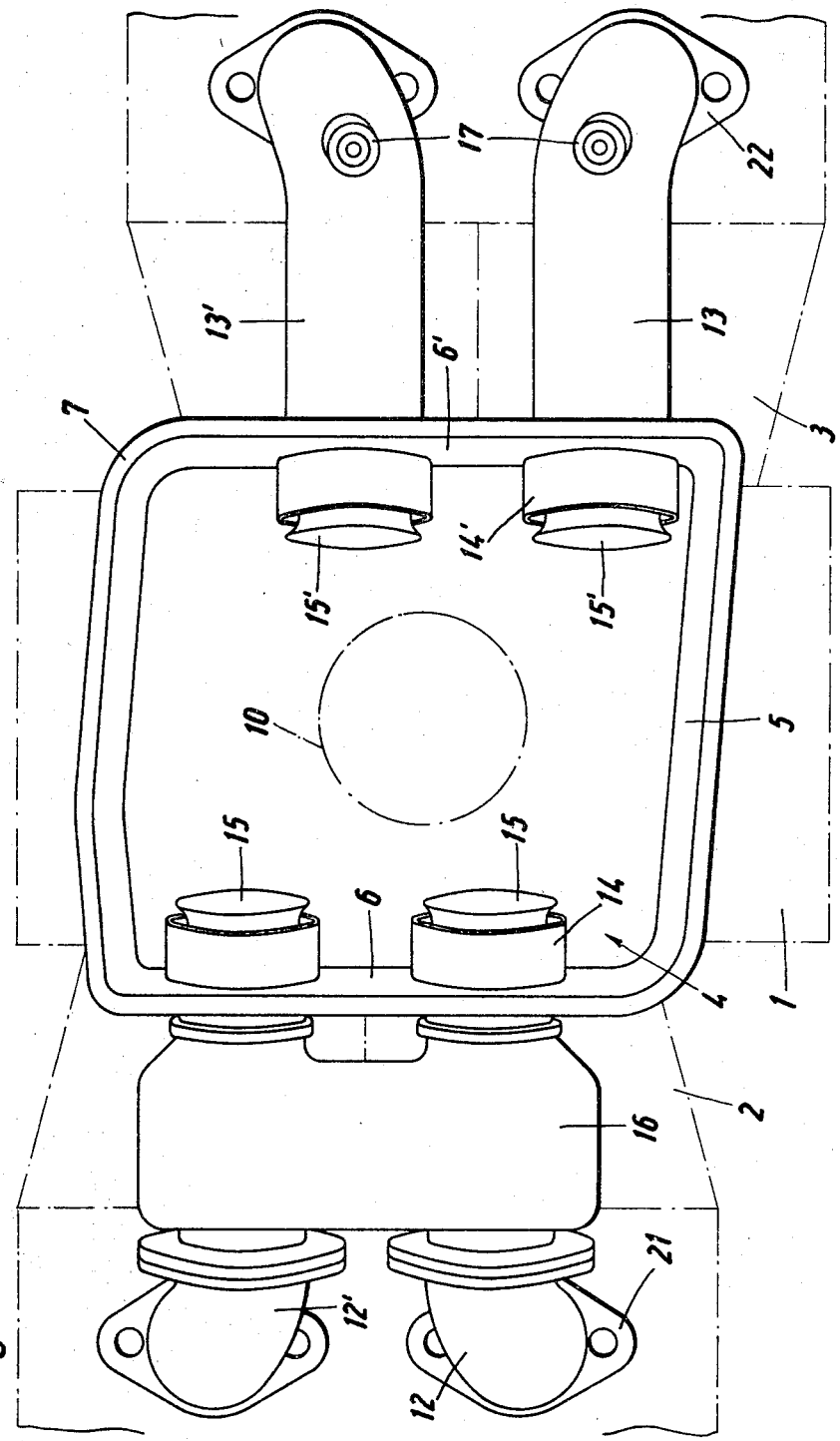
FIG. 2 is a top plan view of the air distribution chamber according to FIG. 1, with the sealing cover being removed.

In the drawings, conventional portions of the engine have been shown schematically to avoid obscuring the novel portions of the invention and because the conventional portions of the engine may generally be of various constructions. The crankcase housing or block 1 of the internal combustion engine is provided with oppositely disposed rows of working cylinders 2 and 3. A tank-shaped or pot-like distribution chamber 4 is mounted above the crankcase 1 and between the opposed cylinders 2, 3 for distributing the combustion air. The chamber 4 comprises a lower wall 5 and side walls 6, 6' having rims 7 receiving thereon a resilient sealing strip or gasket 8. A lid or cover 9 is fastened by means of conventional quick-action locks to the upper portion of the chamber 4 to tightly seal against the rims 7 with the interposition of the gasket 8. The cover 9 is provided with inlet air port 10 having a central axis Z—Z. The inlet air port 10 of the cover 9 is connected to an air conduit 11, which is in turn connected to the pure-air chamber of the combustion air cleaner or filter, not shown, of the engine.

A plurality of tubular or annular fittings 14, 14' are inserted into and connected to the side walls 6, 6' of the air distribution chamber 4; the number of these fittings corresponds to the number of stub intake conduits 12, 12' and 13, 13', respectively of the working cylinders 2, 3. The fittings 14, 14' receive therein the stubs or tubular portions 15, 15', respectively, of the intake conduits passing therethrough. The tubular portions 15, 15' have center axes X—X and Y—Y, respectively, that intersect each other and intersect the axis Z—Z of the inlet port 10 at a common point m. For the intake conduit 12, a carburetor 16 is disposed downstream of the tubular portion 15. All of the intake conduits may be provided with a similar carburetor, or as shown in the drawing the opposed intake conduit 13 may be provided with a fuel injection nozzle 17 downstream of the tubular portion 15', as shown in FIG. 1. Also, it is contemplated that all of the intake conduits may be provided with fuel injection nozzles.

For the support of the air distribution chamber, each of the tubular portions 15, 15' is surrounded by a resilient, preferably rubber, ring 18, 18' respectively. The rubber ring 18 is held within the channel of a tubular holder 19, which holder extends between the tubular portion 15 and the fitting 14 pertaining thereto. The holder 19 is rigidly connected with the intake stub or tubular portion 15. In the alternative or in combination, the rubber ring 18' may be held directly in a corresponding annular channel or groove 20 in the tubular portion 15' of the intake conduit 13, as shown in the righthand portion of FIG. 1.

To disassemble the intake manifold system, including the air distribution chamber, the flange connections 21 and 22 for the intake conduits 12 and 13, respectively, are released by the removal of appropriate bolts (not shown). Thereafter, the structural units shown in solid lines may be lifted off of the internal combustion engine. After removal, the individual stub intake conduits 12, 13 may be axially pulled out of their respective tubular fittings 14, 14' in the side walls of the air distribution chamber or housing 4. No special tools of any kind are required for the above disassembly. The assembly of the structural unit may be accomplished analogously in the reverse order.

The air distribution chamber 4, including the lid 9, may be constructed of a synthetic plastic or may be constructed of sheet metal. Further modifications, variations and embodiments are contemplated within the spirit and scope of the present invention.

We claim:

1. An internal combustion engine, comprising: oppositely disposed working cylinders with stub intake conduits; an air distribution chamber between said cylinders; said stub intake conduits being supportingly connected at one end to their respective cylinders and at the other end to said distribution chamber and forming the only support for said distribution chamber, including an intake air filter operatively connected upstream of said distribution chamber; resilient means interposed between said distribution chamber and each of said stub intake conduits; said stub intake conduits extending into said distribution chamber.

2. The engine according to claim 1, wherein said distribution chamber has an inlet air port having a central axis; said intake stub conduits extending into said distribution chamber about respective center axes intersecting each other at an angle and intersecting said central axis of said air inlet port.

3. The engine according to claim 2, wherein said resilient means is a resilient ring surrounding each intake stub conduit; said distribution chamber having a tubular fitting telescopically guidingly receiving therein said resilient ring.

4. The engine according to claim 3, including a tubular holder securely mounting said resilient ring and extending between each of said tubular fittings and respective stub intake conduits.

5. The engine according to claim 1, wherein each of said stub intake conduits terminates at the end adjacent said distribution chamber in a tubular portion having a central axis; said distribution chamber having an annular portion telescopically receiving therein each of said tubular portions with lost motion in the direction of said tubular portion central axis.

6. The engine according to claim 5, including a resilient ring between each of said annular portions and corresponding tubular portion.

7. The engine according to claim 1, wherein said distribution chamber is constructed of a synthetic material.

8. The engine according to claim 1, wherein each of said intake stub conduits includes only a single tubular portion extending into said distribution chamber for each working cylinder.

9. The engine according to claim 1, wherein said resilient means is a resilient ring surrounding each intake stub conduit; said distribution chamber having a tubular fitting telescopically guidingly receiving therein said resilient ring.

10. The engine according to claim 9, including a tubular holder securely mounting said resilient ring and extending between each of said tubular fittings and respective stub intake conduits.

References Cited

UNITED STATES PATENTS

| | | |
|---|---|---|
| 1,078,919 | 11/1918 | Hall. |
| 2,382,244 | 8/1945 | Lundquist et al. |
| 2,730,339 | 1/1956 | Presnell. |
| 2,869,526 | 1/1959 | Dolza. |
| 2,871,841 | 2/1959 | Goodridge et al. |
| 2,909,165 | 10/1959 | Dolza. |
| 2,916,027 | 12/1959 | Chayne et al. |

FOREIGN PATENTS

| | | |
|---|---|---|
| 2,832,224 | 1/1929 | Great Britain. |

WENDELL E. BURNS, Primary Examiner